United States Patent
Rosu

(10) Patent No.: US 8,224,980 B2
(45) Date of Patent: Jul. 17, 2012

(54) ADAPTIVE PARSING AND COMPRESSION OF SOAP MESSAGES

(75) Inventor: Marcel-Catalin Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 11/745,205

(22) Filed: May 7, 2007

(65) Prior Publication Data

US 2008/0281920 A1    Nov. 13, 2008

(51) Int. Cl.
G06F 15/15 (2006.01)
(52) U.S. Cl. .......................... 709/230; 709/204
(58) Field of Classification Search .................. 709/247, 709/246, 230
See application file for complete search history.

(56) References Cited

U.S. PATENT DOCUMENTS

| 2002/0065822 | A1 | 5/2002 | Itani |
| 2006/0041579 | A1 | 2/2006 | Miyashita et al. |
| 2007/0136492 | A1* | 6/2007 | Blum et al. ................ 709/247 |

OTHER PUBLICATIONS

Margaret G. Kostoulas et al., XML Screamer: An Integrated Approach to High Performance XML Parsing, Validation and Deserialization, in Proceedings of the 15th International World Wide Web Conference 2006, 93-102.
Toyotaro Suzumura et al., Optimizing Web Services Performance by Differential Deserialization, in Proceedings of the 2005 IEEE International Conference on web services (ICWS'05), 185-192.
Toshiro Takase et al., An Adaptive, Fast, and Safe XML Parser Based on Byte Sequences Memorization, in Proceedings of the 14th International World Wide Web Conference 2005, 692-701.
Nayef Abu-Ghazaleh et al., Differential Serialization for Optimized SOAP Performance. In proceedings of 13th International Symposium on High Performance Distrubuted Computing (HPDC), Honolulu Hawaii pp. 55-64, Jun. 2004.
Toyotaro Suzumura, et al., Optimizing Differential XML Processing by Leveraging Schema and Statistics, 4th International Conference on Service Oriented Computing (ICSOC'06).
Hartmut Liefke, et al., XMill: an Efficient Compressor for XML Data, in Proceedings of the 2000 ACM International Conference on Management of Data, 153-164.
Marc Girardot et al., Millau: an encoding format for efficient representation and exchange of XML over the Web, in Proceedings of the 9th International World Wide Web Conference 2000, 747-765.
Naresh Apte et al., Wireless SOAP: Optimizations for Mobile Wireless Web Services, in Proceedings of the 14th International World Wide Web Conference 2005, (POSTER) 1178-1179.

(Continued)

*Primary Examiner* — Ian N Moore
*Assistant Examiner* — Afshawn Towfighi
(74) *Attorney, Agent, or Firm* — Scully, Scott, Murphy & Presser, P.C.

(57) ABSTRACT

A method and system for optimizing SOAP messages combines mechanisms of accelerating the composition of SOAP messages, reducing SOAP parsing overheads, and reducing SOAP message sizes by leveraging elements of the previous two techniques and policies for configuring these mechanisms. A byte-level partial representation of a SOAP message may be constructed upon its first use and each new instantiation of the same message is composed from this representation and the encoded parameters or return values. SOAP message parsing may be accelerated using a cache of associations. Each entry may associate the byte-level encoding of an XML tag with its component in the internal data representation of the received message. These two techniques can be used independently on one or both SOAP endpoints.

20 Claims, 4 Drawing Sheets

OTHER PUBLICATIONS

Michael R. Head et al., A benchmark Suite for SOAP-based Communication in Grid Web Services, in Supercomputing 2005.

Christian Werner et al., Compression SOAP Messages by using Differential Encoding, in Proceedings of the IEEE International Conference on Web Services (ICWS), 2004, 540-547.

Bruce Martin et al., (Eds), WAP Binary XML Content Format, W3C Note Jun. 24, 1999, www.w3.org/TR/wbxml.

Robin Berjon et al., Efficient XML Interchange Working Group, www.w3.org/XML/EXI/report.

M. Raghunath et al.., Inverted Browser: A Novel Approach towards Display Symbiosis, in Proceedings of 4th IEEE International Conference on Pervasive Computing and Communications (PerCom), 2006, 71-76.

* cited by examiner

```
POST /ws/pid/CheapCalculator HTTP/1.1
Content-Type: text/xml
SOAPAction:
Cache-Control: no-cache
Pragma: no-cache
User-Agent: Java/1.4.2
Host: 127.0.0.1:8080
Accept: text/html, image/gif, image/jpeg, *; q=.2, */*; q=.2
Connection: keep-alive
Content-Length: 215

<soapenv:Envelope xmlns:soapenv="http://schemas.xmlsoap.org/soap.envelope/">
   <soapenv:Body>
      <ns1:add xmlns:ns1="http://calc.ibm.com">
         <ns1:in0>7</ns1:in0>
         <ns1:in1>5</ns1:in1>
      a</ns1:add>
   </soapenv:Body></scapenv:Envelope>
```
⎬ 202

```
POST /ws/pid/CheapCalculator HTTP/1.1
Content-Type: text/xml
SOAPAction:
Cache-Control: no-cache
Pragma: no-cache
User-Agent: Java/1.4.2
Host: localhost:8080
Accept: text/html, image/gif, image/jpeg, *; q=.2, */*; q=.2
Connection: keep-alive
Content-Length: 216

<soapenv:Envelope xmlns:soapenv="http://schemas.xmlsoap.org/soap.envelope/">
   <soapenv:Body>
      <ns1:mul xmlns:ns1="http://calc.ibm.com">
         <ns1:in0>3</ns1:in0>
         <ns1:in1>11</ns1:in1>
      a</ns1:mul>
   </soapenv:Body></soapenv:Envelope>
```
⎬ 204

FIG. 2

ADAPTIVE PARSING AND COMPRESSION OF SOAP MESSAGES

FIELD OF THE INVENTION

The present invention relates to network protocols and data compression, and particularly to reducing protocol processing overheads and message sizes.

BACKGROUND OF THE INVENTION

Web services (WS) are designed to support interoperability across middleware platforms from different vendors. As a result, the XML-centric, message- and standard-based, WS technology is one of the most popular bases for the realization of the Service Oriented Architecture (SOA). A new approach to architecting IT systems, SOA is based on loose coupling and dynamic binding between services representing applications of one or more enterprises. Services are defined at an abstract level such that service consumers can bind to these definitions. Service providers implement these definitions and publish the details necessary for the consumers to connect to the services. Finally, service consumers must have a way to reliably find the services they need. The WS technology currently offers a solution to the bind/publish/find needs of the SOA architecture and they are evolving towards addressing these needs even better, with improved security and quality of service features or with enhanced service discovery and composition facilities based on semantic technologies.

Major trends in business IT, such as outsourcing and continuous business process optimization, are among the reasons why the importance of the SOA approach is expected to increase in the foreseeable future. To satisfy the requirements of an increasingly mobile workforce, many SOA implementations include devices with limited computing or communication capabilities, such as smart phones, PDAs or UMPCs.

In the pervasive domain, WS technology is becoming one of the favorite solution for exporting the capabilities of mobile devices or of the environment, and for service discovery and invocation. Semantic extensions to WS technology allow the dynamic generation of personalized UIs, which enable independent deployment of environmental services and mobile devices.

The success of WS technology is to a large extent due to its reliance of XML and its self-describing characteristic. Web Service descriptions, which define service operations and their messages, the data types used in these messages, and the service endpoints are defined using XML. Service policies, repositories and more recent semantics are also described using XML-derived languages. When using SOAP, which is the typical WS messaging framework, a large part of the message is in XML. In contrast to WS-related definitions, where the verbose nature of XML does not introduce a performance bottleneck, the performance of SOAP messaging is negatively impacted by XML-related processing and communication overheads. Thus, it is desirable to have a mechanism for optimizing SOAP.

BRIEF SUMMARY OF THE INVENTION

A method for adaptively parsing and compressing messages are provided. The method in one aspect may comprise parsing an incoming message formatted in a marked up language having a plurality of tag elements, associating the plurality of tag elements in the incoming message with a plurality of unique keys respectively, building a dictionary including at least the tag element to the unique key associations, parsing a second incoming message using one or more associations in the dictionary, composing an outgoing message in the marked up language, identifying one or more unique keys associated with respective one or more tag elements in the outgoing message using the dictionary, and replacing said one or more one or more tag elements in the outgoing message with respective said one or more unique keys identified in the dictionary.

A system and program storage device for performing the above methods are also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 shows a code fragment sharing tags across operations.

DETAILED DESCRIPTION

An adaptive parsing and compression of SOAP messages or the like, also referred to in this disclosure as A-SOAP is provided. In one embodiment, the method and system takes advantage of the repetitive nature of Web Services traffic between two endpoints to reduce SOAP processing overheads and message sizes. For instance, the method and system of the present disclosure in one embodiment may address WS interactions involving a client that repeatedly invokes the same or similar operations. An example scenario from the domain of pervasive computing is using WS-enabled PDAs or cell phones as universal remote controls to interact with devices or services in the environment, such as public displays or thermostats. Two A-SOAP endpoints incrementally build data structures describing one or more elements of previous invocations and maintain them in close synchrony. In one embodiment, most of the work may be done in the initial invocation (and response) of each operation; once built, the data structures rarely need to be updated and they can be thought as providing a form of 'caching' for the SOAP processor. The data structure may be used to accelerate future invocations and to compress the corresponding messages. In one embodiment, A-SOAP may be implemented as an option in a typical SOAP engine, that is, for use with interactions with certain endpoints.

Figure 1:
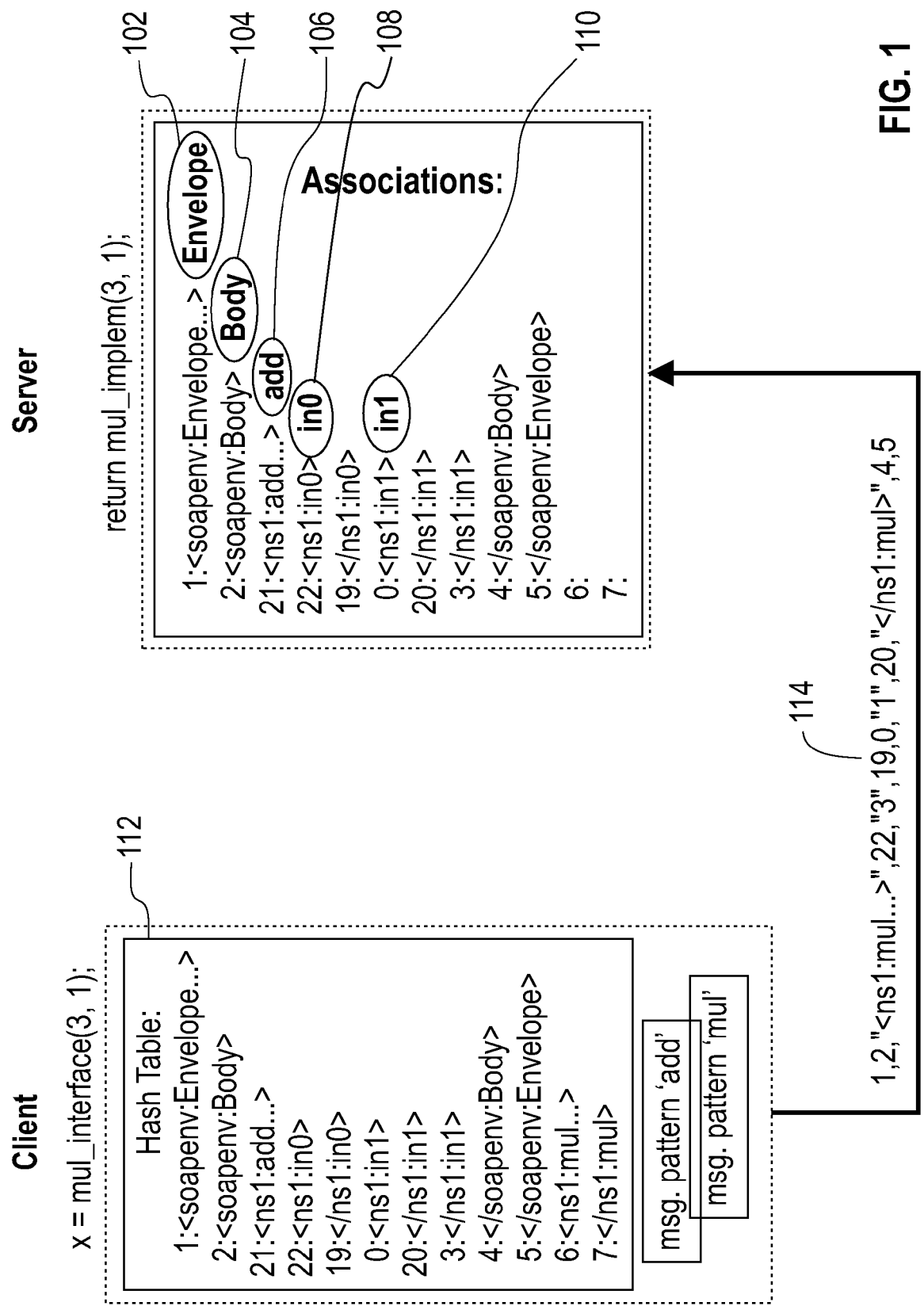
FIG. 1 illustrates components of the client and server A-SOAP stacks and a compressed message on-the-fly between them.

A-SOAP in one embodiment may comprise three mechanisms, configured by a mutually agreed policy or by a local default policy: accelerating the composition of SOAP messages, reducing SOAP parsing overheads, and compressing SOAP messages by leveraging one or more elements of the previous two optimizations. FIG. 1 illustrates components of the client and server A-SOAP stacks and a compressed message on-the-fly between them.

SOAP messages are typically composed by serializing and encoding an internal representation of the request or response message. The internal representation, which is a tree mirroring the XML structure of the outgoing SOAP message, is built for each new message, on the client or server endpoint, from an internal representation of the operation being invoked and its parameters or return value, respectively. An A-SOAP approach in one embodiment builds a 'close-to-final' representation of an outgoing message, called message pattern, upon its first usage, and fills-in the remaining elements dynamically, for each new instantiation of the message. An A-SOAP engine may execute many of the operations commonly executed for each new message (and a few extra) only once and 'cache' the intermediate result, which may be an incomplete representation of the final data structure, in memory for reuse. For instance, after sending the first two request messages shown in FIG. 2, the client endpoint has built two message patterns, for the 'add' and 'mul' operations, respectively (shown in FIG. 1).

Parsing a SOAP message typically yields an internal data structure used to identify the operation to be invoked and its parameters (on the server) or the result of the operation invocation (on the client). Similar to message composition, this data structure is commonly a tree mirroring the XML structure of the incoming message. Parsing is accelerated in A-SOAP in one embodiment by incrementally building a collection of associations; each element associates the byte-level encoding of an XML tag in the incoming SOAP message with the component of the internal data representation of the message that it generated, which is typically a tree node. The collection is indexed by the first element of the associations, i.e., the encoded representation of the XML tag. Subsequent encounters of the same XML tag are identified using byte sequence comparisons and their processing is accelerated by reusing the second element of the association to build the internal representation of the message. A-SOAP may assume that the internal representation of the message is not accessible outside of the SOAP stack and, therefore, not modified nor referenced beyond its intended usage. FIG. 1 shows a set of associations (102, 104, 106, 108, 110) after parsing the first request for the 'add' WS operation. The nodes allocated when the first request was parsed, are now part of the association set; all but one (the 'add' node) may be reused when the second request for the 'mul' WS operation is parsed. In addition, two new association, for the <ns1:mul . . . > and </ns1: mul> tags, may be created.

These two mechanisms can be used separately or together, on one or both SOAP endpoints, and for one or both directions of a SOAP interaction. The third mechanism uses a technique similar to dictionary coding to perform message compression. Both SOAP endpoints may implement extended forms of the first and second mechanisms, on the sending and receiving node, respectively. A message composition may be extended to maintain a dictionary, labeled "Hash Table" 112 in FIG. 1, of XML tags that were already used in an outgoing SOAP message. Upon subsequent usages, the XML tag encoding is replaced by its index in a dictionary, which for example may be a small integer, with a much shorter representation. As a result, resulting messages are much shorter. On the receiving endpoint, the collection of associations used for accelerating XML parsing is used as a dictionary. This technique also allows XML parsing to be replaced by faster indexing operations.

In one embodiment, the two dictionaries are organized the same way and kept in sync, such that an XML tag is assigned the same index at both ends. In FIG. 1, the number in front of each tag represents its index in the dictionary. Tags are listed in the order they were inserted in the dictionary. In the message 114 shown in FIG. 1, XML tags already in the client dictionary are replaced by their indexes, while new tags are sent uncompressed. The parameters in the request, which in this example are the integers '3' and '1', are not compressed.

In one embodiment, compression is done separately in each direction; therefore, in this embodiment, four dictionaries are used to compress both requests and responses. The two endpoints agree on a configuration policy that determines the size and structure of the dictionaries using a handshake protocol during the initial invocation. One such protocol may be implemented using extensions of the immediately lower layer, which is typically HTTP. A-SOAP message compression may be a hop-by-hop optimization and it may assume that the enhanced protocol is stateful, i.e., the two endpoints can keep their dictionaries synchronized.

In one embodiment of the present invention, adaptive SOAP message parsing and compression method and system may integrate fast message composition, accelerated message parsing and message compression. However, fast message composition, accelerate message parsing and message compression may each be used separately, if desired. For instance, if the other endpoint does not support A-SOAP, fast message composition and accelerated parsing can still be used locally, configured with a default policy. Even if both endpoints support A-SOAP but messages in one direction are much smaller than in the other direction, such as when requests are much smaller than responses, A-SOAP mechanisms can be used for one direction only.

Fast Message Composition

For achieving fast message composition, A-SOAP in one embodiment accelerates the outgoing path by building a 'close-to-final' representation of the outgoing message, called message pattern, upon say its first usage (depending on the configuration policy), and filling-in the remaining elements (parameters or return value) dynamically, upon subsequent usages of the message. An internal representation of each message is used to generate the message pattern, on both server and client endpoints. The format of this representation and the way it is generated from the service description on the client and server endpoints is implementation dependent. In one example implementation, a message pattern may have a byte-level (UTF-8 encoded) representation of the XML tags in the message. For every new instance of the message, the pattern is merged with the encoded representation of the parameters or return value. Parameters or return values are validated before the encoding. For instance, for the first message shown in FIG. 2, the message pattern is an array with three elements, where each element is a byte array representing the following XML tags, in order: <soapenv:Envelope . . . >, <soapenv:Body>, <ns1:add . . . > and <ns1:in 0>; </ns1:in 0> and <ns1:in1>; </ns1:in1>, </ns2:add>, </soapenv:Body>, and </soapenv:Envelope>. For the second message in FIG. 2, a similar pattern is generated with "add" being replaced by "mul."

For array parameters, the pattern may include the byte-array encodings of the two XML tags for the element name. When a message instance is composed, the two byte arrays or the two tags are replicated for each array element and the result is merged with the pattern as for any other parameter.

In one embodiment, array parameters of variable size or using an offset may be handled differently because the start XML tag is not guaranteed to be the same in all messages.

An endpoint maintains a pattern for each message it has sent and expects to send again, and it can use the same message pattern when invoking the same operation on mirrored servers or when responding to different clients. In one embodiment, for each separate remote endpoint, one set of message patterns may be built and stored locally; this set comprises one pattern for each operation implemented locally or invoked remotely, on the server and client endpoints, respectively. Policies for determining for which endpoints this optimization should be used and for how long should the pattern be kept in memory may be defined as desired and may be an implementation choice.

In another embodiment, to accelerate the outgoing path of a SOAP engine, most of the operations on the original outgoing path may be executed and a partially built representation of the outgoing message be saved, for example, as an incomplete tree. Subsequent messages compositions may reuse this partial representation, therefore reusing part of the initial execution sequence, which may include mostly of memory management operations. This embodiment allows for attribute values to be changed before the pattern is used and for (at least) some handlers to be used with the outgoing path. The final representation of the message is serialized for each new message instantiation.

Figure 3:
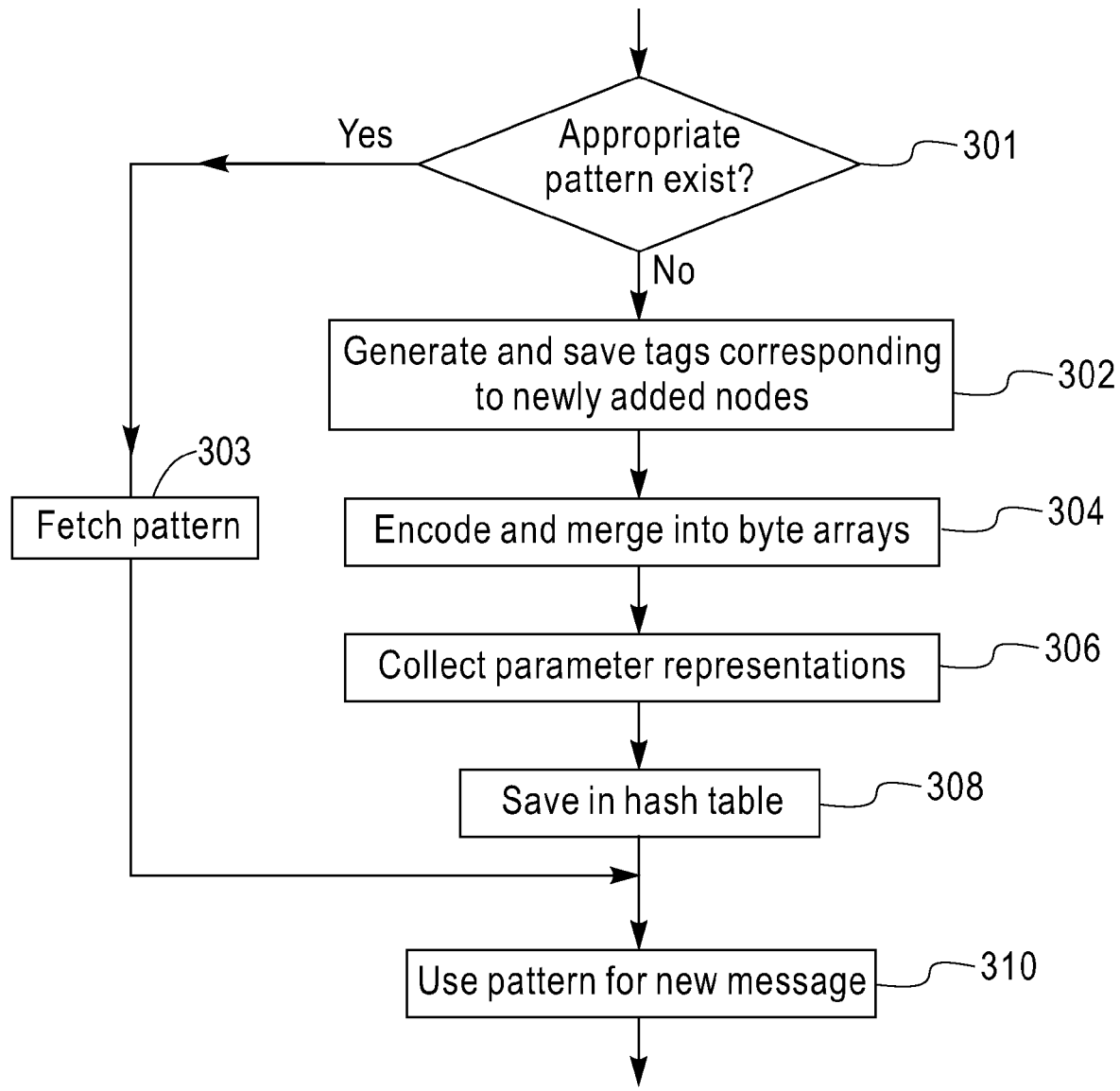
FIG. 3 is a flow diagram illustrating fast message composition of the present disclosure in one embodiment.

FIG. 3 is a flow diagram illustrating fast message composition of the present disclosure in one embodiment. In one embodiment, if no message pattern for the current request or response message/operation is found, at 301, a new message pattern may be constructed by a code path closely derived from the original code for building the tree representing an outgoing message. At 302, as the tree is built, the XML tags corresponding to the newly added nodes are generated and saved in an ordered list data structure together with objects representing the missing parameters. For complex data types, such as arrays, these objects may contain additional precomputed message bits, such as element name tags. The new code path stops following closely the original path upon encountering parameter processing. At 304, in one path over the list, the tags collected in the first step are encoded and merged in several byte arrays. These arrays represent the elements of the first message pattern component. At 306, parameter representations are collected in the second pattern array. At 308, a newly created pattern is saved in a hash table indexed by the operation name. If a pattern is found at 301, the existing message pattern is fetched at 303. Upon sending a new message at 310, the new or an existing message pattern is used.

Accelerated Message Parsing

Figure 4:
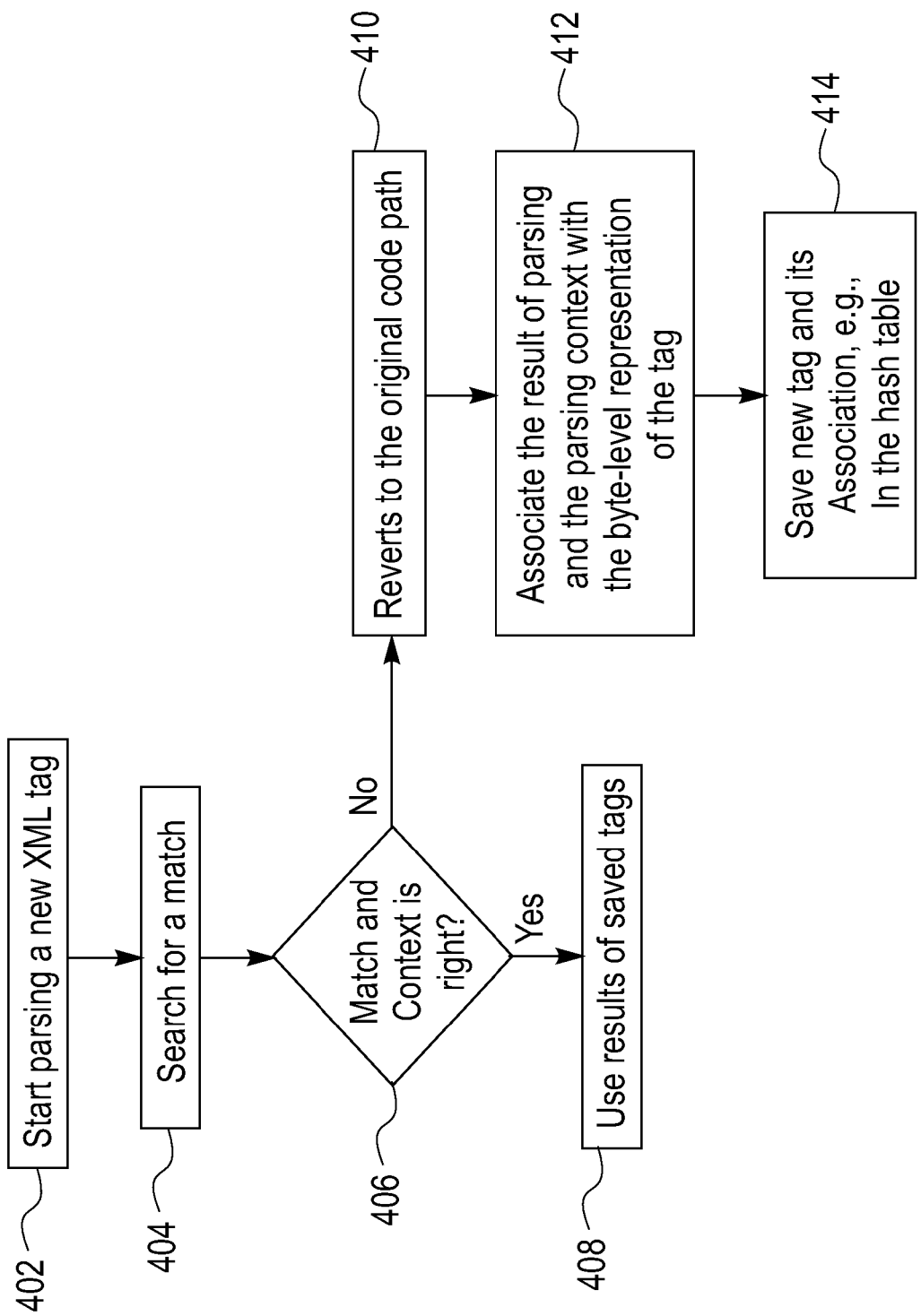
FIG. 4 is a flow diagram illustrating accelerated message parsing of the present disclosure in one embodiment.

For achieving accelerated message parsing in one embodiment, the incoming message path is parsed based on using the results of processing previous messages to accelerate the parsing of the current message. The result of parsing a SOAP message is a parsing tree describing its structure. The tree is used to identify the operation to be invoked or the result to be returned to the client stub. After that, the data structure is discarded. A-SOAP saves fragments of this data structure for later reuse. FIG. 4 is a flow diagram illustrating the handling of XML tags in the accelerated message parsing of the present disclosure in one embodiment. At 402, parsing an XML tag in the incoming SOAP message begins. At 404, whenever the start of an XML tag is expected during the parsing of a message, existing associations are searched for a match. In one embodiment, the search uses byte-level comparisons between the input stream and the saved XML tags. At 406, if a match is found and if the context is the same as when the association is created, the result of parsing the original tag is reused at 408. For instance, when a start tag is matched in the same context as when it was first parsed, the parsing tree of the current message is expanded with the node stored in the association. Similarly, upon matching an end tag, the information stored in the association is used to check the correctness of the message. If no match is found or the context is different, parsing of the XML tag continues on the original code path at 410. When tag parsing is done, the result of parsing and the parsing context are associated with the byte-level representation of the tag at 412. Depending of the current configuration policy, the new association is added to the existing collection and possibly used for the next message at 414.

One collection of associations is maintained for each remote endpoint and it may be shared between all the operations invoked remotely (on client) or implemented locally (on server). This is different from the mechanism of the incoming path, which typically requires one message pattern per operation.

Typically, parsing starts with several matches, as the envelope, header and body tags are shared between operations. After parsing reverts to the slow path, it is more difficult to find matches or to determine that the right context exists. For instance, consider the case of an 'add' request message 202 immediately followed by a 'mul' request message 204, as shown in FIG. 2. In this example, 'add' and 'mul' represent two integer operations of a WS calculator. In addition, assume that these are the first two invocations of the WS calculator. In this example, A-SOAP creates an association for every XML tag in the first message. If the second message is another 'add' request, all these associations are used. In the example, only the "soapenv:Envelope" and "soapenv:Body" start and end tag can be immediately reused to accelerate parsing. After that, the parser reverts to the slow path and it creates a new association for the "ns1:mul" start tag. A-SOAP reverts to the fast path after recognizing that the name space definitions for the "ns1:in0" and "ns1:in1" tags in the first and second message are the same in both messages. Next, the parser reverts to the slow path and it creates a new association for the "ns1:mul" end tag. Finally, the parser reverts to the fast path for the remaining end tags.

Using identical tags in the messages used for different operations, as illustrated in FIG. 2, is not uncommon. This is probably due to the fact that most WS definitions are generated automatically by a server component from the (Java) interface definition of the service. For certain WS definitions, the maximum number of associations used on each endpoint, which is the same as the number of constant XML tags that can be used in each direction, can be inferred from examining the WSDL file. In one embodiment, the same collection of associations need not be used for different remote endpoints.

Similar to the fast message composition mechanism described above, accelerated parsing can be activated selectively, for example, only for interactions with endpoints sending frequent messages. Policies for determining for which endpoints this optimization should be used and for how long should the collection of associations should be kept in memory may be implemented as desired and may be left to implementation choice.

A-SOAP message parsing acceleration in one embodiment uses an open addressing hash table to store associations between XML tags and the result of parsing them. In one embodiment, A-SOAP caches the results of XML tag parsing for later reuse. An implementation of the example may use a SAX parser and extend the SAX interface with a few handlers.

Initially, the hash table may be empty. A parser of the present disclosure, for example, may create and store an association after successfully parsing an XML tag in the hash table. Whenever a new tag is expected, the parser may search for a match using byte-level comparisons on the encoded byte stream. If no match is found, the parser marks the possible start of a new tag and reverts to the original code path. If successful, an association is created and the bytes between the marker and the current position are saved as the association's first element. Bytes one to n are used to compute the hash entry of the association. In one embodiment, byte zero is not used as it is always assumed to be the '<' character. N may be set by a policy and tags shorter than n+1 characters are not cached in one embodiment. If a collision occurs, the hash table is search sequentially for an empty slot (linear probing with interval 1). The second element of the association may include:

the tag type: start, empty-element or end;
the parsing tree node to be generated by a start or empty-element tag, or to be checked against an end tag;
the set of valid parent nodes.

As the SOAP message is parsed, the nodes on the current path of the parse tree are stored in a stack. In one embodiment, the parser uses the stack to check if the SOAP message is well-formed and to manage the context of an association. For instance, upon matching an association corresponding to a start tag, the parsing tree node cached in the association is pushed on top of the stack. Upon matching an end tag association, the cached tree node is checked against the top of the stack. Upon creation, the set of valid parent nodes in an association is initialized to the top of the stack node.

In one embodiment, the parsing tree nodes cached in associations are allocated when the corresponding tags are parsed for the first time. By reusing them, the A-SOAP engine saves a number of memory management operations. In order for A-SOAP to reuse these nodes for subsequent messages, in one embodiment, the original stack maintains no reference to the parsing tree of a message (or to parts of it), after the message is processed.

An association can be used for accelerated parsing, i.e., a match is found, if the following two conditions are satisfied:
1. The input stream should match the first element of an association.
2. The current namespace definitions, i.e., context, to be exactly the same as when the association was created.

The hash computation uses the n bytes in the input stream after the next. To check if the matches found are correct, their byte arrays are checked against the input stream, starting with the end of the byte array and the corresponding byte in the input stream. Performing the comparison backward may identify mismatches earlier. To satisfy the second condition, for start or empty-element tags only, the top of the stack must be in the set of valid parent nodes, as recorded in the second component of the association. If this is true, the association can be used, as the set of current namespace definitions is exactly the same as when the association was created. If not, the set of current namespace definitions is checked recursively, down the stack. If successful, the top of the stack is added to the set of valid parents. For instance, the associations corresponding to tags <ns1:in0> and <ns1:in1> in FIG. 2 have two parents, the two nodes corresponding to the start tags for the 'add' and 'mul' operations.

The WS definition can be used to size the hash table appropriately. In one embodiment, the table may be large enough to accommodate all the possible XML tags in an interaction. For other situations, such as when arrays parameters of variable sizes and offsets are transmitted, in which the table size may not be able to accommodate all tags, policies for replacing associations when the hash table becomes fall may be defined. In another embodiment, a different data structure may be used for storing associations to accommodate the tags.

Message Compression

For achieving message compression in one embodiment, A-SOAP performs an XML-oriented compression of the message. Message compression in A-SOAP may be a form of dictionary encoding that is integrated with fast message composition and accelerated message parsing, on the sending and receiving endpoints, respectively. The entries in the dictionary are XML tags used in a regular message. On the sending endpoint, each entry represents a tag that was already sent. On the receiving endpoint, each entry represents a tag that was already received. In one embodiment, the contents of the two dictionaries are identical, except for new XML tags used in the current in-flight message.

In one embodiment, no message elements, such as parameters or return values, other than its XML tags are stored in the dictionary. Therefore, identical parameters in successive messages are not compressed. By targeting XML tags only, A-SOAP compression allows for a low overhead design. In addition, message compression leverages the data structures maintained by the previous two mechanisms.

On the sending endpoint, a tag is inserted in the dictionary upon its first usage in an outgoing message. While in the dictionary, the tag is replaced by its index in any outgoing messages. In one embodiment of message composition, the tag encoding is replaced by the encoding of its index directly in the message pattern. In another embodiment, the indexes of the start and end tags corresponding to the tree node are stored in the node such that they can be used during serialization. The method and system of the present disclosure in one embodiment combines faster message composition with message compression.

On the receiving endpoint, a tag is inserted in the dictionary after it is parsed. The collection of associations used to accelerate message parsing may be used as a dictionary. In one embodiment, only the association component that represents the byte-level encoding of the tag is considered as being part of the dictionary. In one embodiment, A-SOAP organizes and manages the two dictionaries identically, which guarantees that the index of the new tag is the same as its index on the sending node. It may also guarantee that for every index received, the corresponding tag is present in the local dictionary.

In one embodiment, if a compressed request is handled by the wrong SOAP engine, for example, one without the proper dictionary, the processing the compressed message may trigger an exception and a fault message is sent back to the client. The dictionary on the server SOAP engine may be lost when the engine is restarted. The client in one embodiment may be able to handle the fault and re-issue the request without using message compression.

Accelerating the parsing of the SOAP message replaces parsing with byte-level comparisons. The decompression of the message goes a step further and it replaces the byte-level comparison of potentially long tags with decoding a two- or three-byte index value from the message stream. The index is used to retrieve the right association from the dictionary. An example of a compressed message is shown in FIG. 1 at 114. The method and system of the present disclosure in one embodiment provides accelerated parsing and message decompression in A-SOAP, working well with the sending endpoint mechanism.

In one embodiment, tags corresponding to optional parameters may be inserted in dictionary after actually being used. In another embodiment, the dictionary may be of fixed size and adding a new tag may need replacing an existing one. If the replaced tag can be used in the current message, the sending and receiving endpoints need to agree on how to handle this case correctly. Another embodiment may use a potentially unbounded size dictionary and empty it after it exceeds a previously agreed size; as a result, both dictionaries are emptied at the same message boundary. In certain cases, the maximum size of the dictionary can be estimated by inspecting the WS definition and the dictionaries can be sized appropriately such that tags are never evicted from the dictionaries. Fixed sized dictionary may allow for more efficient implementations.

Message compression is a form of dictionary encoding, which uses the mapping between a word in the dictionary and its index. The A-SOAP implementation may use the implicit tag labeling described above. In one embodiment, both dictionaries start empty and are organized identically: use same size open addressing hash data structures with the same hash function and linear probing with the same interval. On the sending endpoint, if a new message pattern is necessary to send the message, the XML tags saved in the ordered list already in the dictionary are replaced by their index. As a result, the new message pattern is smaller. After the message is sent, all remaining XML tags are inserted in the dictionary and replaced by their indexes. If any new tags were inserted, a new message pattern, even smaller, may be constructed. In one embodiment, if the hash table is full, an old entry may need to be swapped out before being able to insert a new entry. In such cases, inserting of the new entry may be delayed until the entire message is processed, for instance, to ensure that the dictionaries or hash table at both sending and receiving ends remain synchronized. On the receiving endpoint, each of the indexes found in the message is replaced with an entry in the hash table; the entry found represents the XML tag replaced by the index on the sending endpoint.

An implementation of this example may encode indexes directly inside the UTF-8 encoded message using a couple of unused byte ranges. UTF-8 is a variable-length character encoding created by K. Thompson and R. Pike. Informally, the following properties hold for multi-byte sequences:

the most significant bit of a single-byte character is 0.

the number of consecutive 1s as most significant bits of the first byte in a multi-byte sequence determines its length.

the remaining bytes in the sequence have 10 as their most significant bits.

One of the advantages of UTF is that it is backward compatible with ASCII. For dictionaries with 128 entries or less, A-SOAP may use two bytes to encode dictionary indexes. The parser may recognize the indexes and use them to index into the local dictionary to retrieve the appropriate association.

The method and system of the present disclosure, referred to as, A-SOAP, in the descriptions above, provide practical ways for reducing SOAP processing and bandwidth overheads. A-SOAP may integrate a collection of optimization techniques that have been adapted to leverage each other. Message compression uses fast message composition and accelerated parsing. Shorter messages are faster to compose and parsing is eliminated for the compressed part of the message.

A-SOAP may be designed to improve performance of simple SOA implementations, with WS clients connected directly to WS servers, and exchanging a large number of similar messages. A-SOAP performance may improve as a result of handling WS traffic and tow of its components can be used locally even when the other endpoint does not implement A-SOAP.

A-SOAP may be implemented as a series of modification to existing WS middleware. Such an implementation allows for taking advantage of existing tools and applications. In one embodiment, dictionary indices may be encoded, for instance, to maximize performance improvements. An example implementation that adheres closely to WS standards may achieve similar performance improvements.

In one embodiment, A-SOAP optimizations are domain agnostic and focus on reducing the serialization overheads for XML tags. Further A-SOAP optimizations may be contained entirely below the client stub or server skeleton. As part of accelerating SOAP messages, A-SOAP in embodiment, structures collection of associations to support message compression. In one embodiment, A-SOAP recycles only objects internal to the SOAP stack, thus providing more conservative optimization.

In one embodiment, A-SOAP message compression focuses on XML tags and applies compression to the XML structure. In one embodiment, it may also use only one compressor. A-SOAP has adaptive characteristic, uses dictionary and uses tables built on-the-fly. A-SOAP attempts to compress entire XML tags, assuming that a large number of tags have no attributes or have that their attributes have the same values between successive invocations. In one embodiment, A-SOAP compression does not require code tables to be built off-line, rather it may build them adaptively. In addition, A-SOAP dictionaries are built incrementally, from the existing traffic. If only one small subset of the tags in the WS definition is used in the interaction, the A-SOAP dictionaries at both endpoints are also small. An entry in the A-SOAP dictionaries may represent the entire XML tag, not its name, nor the name of one of its attributes, which further may reduce the number of dictionary entries. In one embodiment, A-SOAP compression is integrated with message composition, or more precisely with the message pattern formation; as a result, it may not have any negative impact on message latencies. In one embodiment, the message patterns used in A-SOAP are constructed when the first SOAP message of that kind is sent.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method for adaptively parsing and compressing messages, comprising:

composing an outgoing message in a marked up language;

identifying one or more unique keys associated with respective one or more tag elements in the outgoing message using a dictionary;

replacing said one or more tag elements in the outgoing message with respective said one or more unique keys identified in the dictionary;

parsing an incoming message formatted in the marked up language having a plurality of tag elements;

associating the plurality of tag elements in the incoming message with a plurality of unique keys respectively;

building the dictionary including at least the tag element to the unique key associations, the dictionary being built incrementally from existing traffic, each entry in the dictionary representing a tag that was sent in the outgoing message or received in the incoming message or combinations thereof, wherein the dictionary that is built adaptively is used to compress the outgoing message, said unique keys being indices of corresponding nodes of a tree data structure built associated with parsing of the marked up language;

constructing a message pattern of the outgoing message upon its first usage and filling in additional elements dynamically for each new instantiation, wherein the message pattern enables accelerated message composition, the constructing further including deriving a code path for building the tree data structure representing the outgoing message, generating the tag elements associated with the outgoing message corresponding to newly added nodes as the tree data structure is built, saving the generated tag elements in an ordered list data structure; and parsing a second incoming message using one or more associations in the dictionary.

2. The method of claim 1, wherein the step of parsing a second incoming message includes:

parsing the second incoming message using a set of associations that associate one or more byte array representing one or more tag elements to a node in a data structure representing the previously parsed incoming message.

3. The method of claim 1, wherein the step of parsing a second incoming message further includes:

adding to the dictionary one or more associations associating one or more tag elements in the second incoming message but not in the dictionary to one or more respective unique keys.

4. The method of claim 1, wherein the step of composing includes:

pre-generating the message pattern having one or more tag elements;

inserting the message pattern with one or more parameters specific to the outgoing message.

5. The method of claim 4, wherein the step of pre-generating includes:

pre-generating the message pattern having one or more tag elements using the dictionary.

6. The method of claim 1, wherein the incoming message, the second incoming message, the outgoing message are SOAP messages.

7. The method of claim 1, further including:

negotiating a policy associated with composing or parsing a message with a receiving or sending endpoint.

8. The method of claim 1, wherein the step of parsing a second incoming message includes:

decoding a compressed element in the second incoming message.

9. A system for adaptively parsing and compressing messages, comprising:

means for parsing an incoming message formatted in a marked up language having a plurality of tag elements;

means for associating the plurality of tag elements in the incoming message with a plurality of unique keys respectively;

means for building a dictionary including at least the tag element to the unique key associations, the dictionary being built incrementally from existing traffic, each entry in the dictionary representing a tag that was sent in the outgoing message or received in the incoming message or combinations thereof, wherein the dictionary that is built adaptively is used to compress the outgoing message, said unique keys being indices of corresponding nodes of a tree data structure built associated with parsing of the marked up language;

means for parsing a second incoming message using one or more associations in the dictionary;

means for composing an outgoing message in the marked up language;

means for identifying one or more unique keys associated with respective one or more tag elements in the outgoing message using the dictionary;

means for replacing said one or more one or more tag elements in the outgoing message with respective said one or more unique keys identified in the dictionary; and means for constructing a message pattern of the outgoing message upon its first usage and filling in additional elements dynamically for each new instantiation, wherein the message pattern enables accelerated message composition, the constructing further including deriving a code path for building the tree data structure representing the outgoing message, generating the tag elements associated with the outgoing message corresponding to newly added nodes as the tree data structure is built, saving the generated tag elements in an ordered list data structure.

10. The system of claim 9, wherein the means for parsing a second incoming message parse the second incoming message using a set of associations that associate one or more byte array representing one or more tag elements to a node in a data structure representing the previously parsed incoming message.

11. The system of claim 9, wherein the means for parsing a second incoming message further adds to the dictionary one or more associations associating one or more tag elements in the second incoming message but not in the dictionary to one or more respective unique keys.

12. The system of claim 9, wherein the means for composing pre-generates the message pattern having one or more tag elements and inserts the message pattern with one or more parameters specific to the outgoing message.

13. A program storage device readable by machine, tangibly embodying a program of instructions executable by the machine to perform a method for adaptively parsing and compressing messages, comprising:

parsing an incoming message formatted in a marked up language having a plurality of tag elements;

associating the plurality of tag elements in the incoming message with a plurality of unique keys respectively;

building a dictionary including at least the tag element to the unique key associations, the dictionary being built incrementally from existing traffic, each entry in the dictionary representing a tag that was sent in the outgoing message or received in the incoming message or combinations thereof, wherein the dictionary that is built adaptively is used to compress the outgoing message, said unique keys being indices of corresponding nodes of a tree data structure built associated with parsing of the marked up language;

parsing a second incoming message using one or more associations in the dictionary; composing an outgoing message in the marked up language;

identifying one or more unique keys associated with respective one or more tag elements in the outgoing message using the dictionary;

replacing said one or more one or more tag elements in the outgoing message with respective said one or more unique keys identified in the dictionary; and constructing a message pattern of the outgoing message upon its first usage and filling in additional elements dynamically for each new instantiation, wherein the message pattern enables accelerated message composition, the constructing further including deriving a code path for building the tree data structure representing the outgoing message, generating the tag elements associated with the outgoing message corresponding to newly added nodes as the tree data structure is built, saving the generated tag elements in an ordered list data structure.

14. The program storage device of claim 13, wherein the step of parsing a second incoming message includes:

parsing the second incoming message using a set of associations that associate one or more byte array representing one or more tag elements to a node in a data structure representing the previously parsed incoming message.

15. The program storage device of claim 13, wherein the step of parsing a second incoming message further includes:

adding to the dictionary one or more associations associating one or more tag elements in the second incoming message but not in the dictionary to one or more respective unique keys.

16. The program storage device of claim 13, wherein the step of composing includes:

pre-generating a message pattern having one or more tag elements;

inserting the message pattern with one or more parameters specific to the outgoing message.

17. The program storage device of claim 13, wherein the step of pre-generating includes:

pre-generating the message pattern having one or more tag elements using the dictionary.

18. The program storage device of claim 13, wherein the incoming message, the second incoming message, the outgoing message are SOAP messages.

19. The program storage device of claim 13, wherein the one or more tag elements are XML tag elements.

20. The program storage device of claim 13, wherein the step of parsing a second incoming message includes:

decoding a compressed element in the second incoming message.

\* \* \* \* \*